(12) United States Patent
Mulligan et al.

(10) Patent No.: US 11,339,553 B2
(45) Date of Patent: May 24, 2022

(54) CAB VISCOUS MOUNT

(71) Applicant: Deere & Company, Moline, IL (US)

(72) Inventors: Patrick J. Mulligan, Dubuque, IA (US); Michael R. Tigges, Dubuque, IA (US); Joseph F. Tilp, Dubuque, IA (US); Trisha L. Oyen, Dubuque, IA (US)

(73) Assignee: Deere & Company, Moline, IL (US)

( * ) Notice: Subject to any disclaimer, the term of this patent is extended or adjusted under 35 U.S.C. 154(b) by 189 days.

(21) Appl. No.: 16/856,099

(22) Filed: Apr. 23, 2020

(65) Prior Publication Data

US 2021/0332556 A1 Oct. 28, 2021

(51) Int. Cl.
*E02F 9/16* (2006.01)
*B62D 24/04* (2006.01)

(52) U.S. Cl.
CPC .............. *E02F 9/166* (2013.01); *B62D 24/04* (2013.01); *E02F 9/163* (2013.01)

(58) Field of Classification Search
CPC .......... E02F 9/166; E02F 9/163; B62D 24/04; B62D 33/0604; B62D 33/067
USPC .... 296/190.05, 190.07, 190.04, 190.06, 35.1
See application file for complete search history.

(56) References Cited

U.S. PATENT DOCUMENTS 3,841,693 A * 10/1974 Reynolds ............. B62D 33/071
180/89.14
3,847,492 A 11/1974 Kennicutt et al.
3,851,913 A * 12/1974 Knoth .................. B62D 33/067
296/35.1
3,853,368 A * 12/1974 Eichelsheim ....... F15B 15/1447
180/89.14
3,940,177 A 2/1976 Miers et al.
(Continued)

FOREIGN PATENT DOCUMENTS

CA 2764668 A1 8/2012
DE 4240449 A1 6/1994

OTHER PUBLICATIONS

Lord Vibration, Shock and Motion Control Products Catalog (129 pages)(2013).
(Continued)

*Primary Examiner* — D Glenn Dayoan
*Assistant Examiner* — E Turner Hicks
(74) *Attorney, Agent, or Firm* — Lucian Wayne Beavers; Patterson Intellectual Property Law, PC (57) ABSTRACT

A work machine includes a machine frame and a cab supported from the machine frame. At least one pivotal connection between the cab and the machine frame allows the cab to be tilted relative to the machine frame. The pivotal connection includes first and second clevises fixed to the machine frame, the first and second clevises including first and second aligned pin openings, respectively. A pivot pin is received through the pin openings so that the pivot pin is pivotable relative to the machine frame. A viscous mount includes a housing portion, a plunger portion, and a flexible element connecting the plunger portion to the housing portion. The housing portion is attached to the cab, and the plunger portion is attached to the pivot pin between the first and second clevises such that the cab and the viscous mount are pivotable with the pivot pin relative to the machine frame.

15 Claims, 7 Drawing Sheets

(56) References Cited

U.S. PATENT DOCUMENTS

| | | | |
|---|---|---|---|
| 3,966,009 A * | 6/1976 | Meacock, II | B62D 33/0608 |
| | | | 180/89.15 |
| 4,061,392 A | 12/1977 | Lowder et al. | |
| 4,271,921 A * | 6/1981 | Ochsner | B62D 33/0604 |
| | | | 180/89.12 |
| 4,556,118 A | 12/1985 | London | |
| 6,374,935 B1 | 4/2002 | Kirschenmann et al. | |
| 7,604,223 B2 | 10/2009 | Kuzukawa | |
| 8,182,024 B2 | 5/2012 | Hayes et al. | |
| 8,448,735 B2 | 5/2013 | Vierkant et al. | |
| 9,193,396 B2 | 11/2015 | Davisdon et al. | |
| 9,897,158 B2 | 2/2018 | Ellen et al. | |
| 10,112,657 B2 | 10/2018 | Bumueller | |
| 2006/0096269 A1 * | 5/2006 | McLean | F16F 1/3863 |
| | | | 56/228 |
| 2007/0027881 A1 | 2/2007 | Srivastava | |
| 2007/0278811 A1 | 12/2007 | Derham et al. | |
| 2012/0200116 A1 | 8/2012 | Klein et al. | |
| 2013/0105236 A1 * | 5/2013 | Vierkant | B62D 33/07 |
| | | | 180/89.14 |
| 2013/0319285 A1 | 12/2013 | Davis et al. | |
| 2015/0239510 A1 | 8/2015 | Davisdon et al. | |
| 2018/0178746 A1 * | 6/2018 | Scott | B62D 33/067 |
| 2019/0100255 A1 * | 4/2019 | Benevelli | B60G 99/002 |
| 2019/0185063 A1 * | 6/2019 | Sasaki | B62D 21/186 |
| 2019/0300076 A1 * | 10/2019 | Tilp | B62D 33/067 |
| 2021/0332556 A1 * | 10/2021 | Mulligan | E02F 9/166 |
| 2021/0387835 A1 * | 12/2021 | Eto | B66C 23/76 |

OTHER PUBLICATIONS

Finnish Examination Report issued in Patent Application No. 20215300, dated Mar. 10, 2022, in 06 pages.

* cited by examiner

CAB VISCOUS MOUNT

FIELD OF THE DISCLOSURE

The present disclosure relates to work machines of the type having a cab which may be tilted relative to a machine frame to provide access to the areas of the work machine below the cab for service of the work machine.

BACKGROUND

Work machines of this type may for example include crawler dozers and loaders, and other work machines having tiltable cabs. Such machines may also use viscous mounts between the cab and the machine frame to dampen vibrations transmitted to the cab. This viscous mount may be included in the pivotal connection between the cab and the machine frame. Such pivotal connections including viscous mounts also need to include a safety connection between the cab and the machine frame to prevent the cab from separating from the machine frame at the viscous mount in the event of rollover.

One example of such a pivotal connection incorporating a viscous mount and a safety connection is shown in U.S. Pat. No. 9,193,396 to Davisdon et al., and assigned to the assignee of the present invention.

There is a continuing need for improvements in the construction of such pivotal connections including viscous mounts.

SUMMARY OF THE DISCLOSURE

In one embodiment a work machine includes a machine frame and a cab supported from the machine frame. At least one pivotal connection between the cab and the machine frame allows the cab to be tilted relative to the machine frame. The pivotal connection includes first and second clevises fixed to the machine frame, the first and second clevises including first and second aligned pin openings, respectively. A pivot pin is received through the pin openings so that the pivot pin is pivotable relative to the machine frame. A viscous mount includes a housing portion, a plunger portion, and a flexible element connecting the plunger portion to the housing portion. The housing portion is attached to the cab, and the plunger portion is attached to the pivot pin between the first and second clevises such that the cab and the viscous mount are pivotable with the pivot pin relative to the machine frame.

In another embodiment a method is provided for assembling a pivotal connection of a cab and a machine frame of a work machine to allow the cab to be tilted relative to the machine frame. The cab includes a mounting flange having a flange opening therein, and at least one safety loop extending from the mounting flange. The method may include steps of:
 (a) placing a first portion of a viscous mount through the flange opening;
 (b) attaching the viscous mount to the mounting flange of the cab;
 (c) lowering the cab and the viscous mount toward the machine frame until the at least one safety loop is aligned with pin openings of first and second clevises attached to the machine frame;
 (d) inserting a pivot pin through the pin openings and the at least one safety loop so that the pivot pin is pivotable relative to the machine frame;
 (e) attaching a second portion of the viscous mount to the pivot pin between the first and second clevises.

Numerous objects, features and advantages of the embodiments set forth herein will be readily apparent to those skilled in the art upon reading of the following disclosure when taken in conjunction with the accompanying drawings.

DETAILED DESCRIPTION

Figure 1:
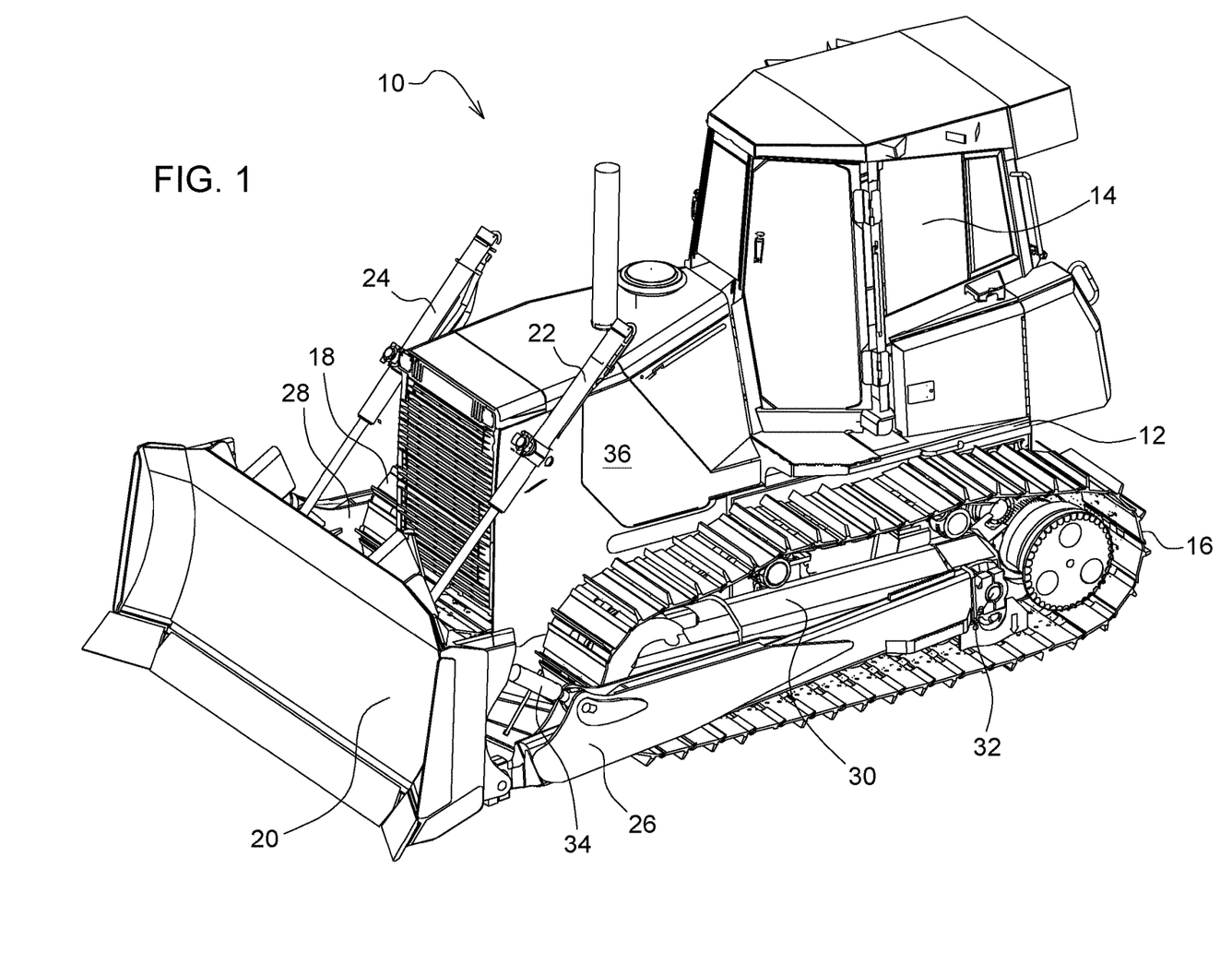
FIG. 1 is a perspective view of a work machine in the form of a crawler dozer.

Referring now to the drawings and particularly to FIG. 1, a work machine is shown in side elevation view and generally designated by the number 10. FIG. 1 shows a crawler dozer 10. The systems disclosed herein are also applicable to crawler loaders and other work machines having a tiltable cab.

The work machine 10 includes a machine frame 12 and a cab 14 supported from the machine frame 12. The machine frame 12 is carried on two crawler tracks 16, 18. A working implement such as a dozer blade 20 is attached to the front of the work machine 10. Lifting actuators 22, 24 lift the dozer blade 20 on lifting arms 26, 28. Arm 26 is pivotally attached to a track frame 30 of crawler track 16 at pivotal connection 32. Arm 28 is similarly mounted on the right side of the work machine 10. Tilting actuators such as 34 are connected between the lifting arms 26, 28 and the work implement 20 to tilt the work implement 20 relative to the lifting arms. A hood 36 covers a drive engine (not shown) which powers the various components of the work machine 10. The drive engine may drive a plurality of hydraulic pumps to provide hydraulic power to the crawler tracks 16, 18, the actuators such as 24, 26, 34, and the various other components of the work machine 10.

FIG. 1 shows the cab 14 in its lowered operating position with the cab 14 fully supported from the machine frame 12.

Figure 2:
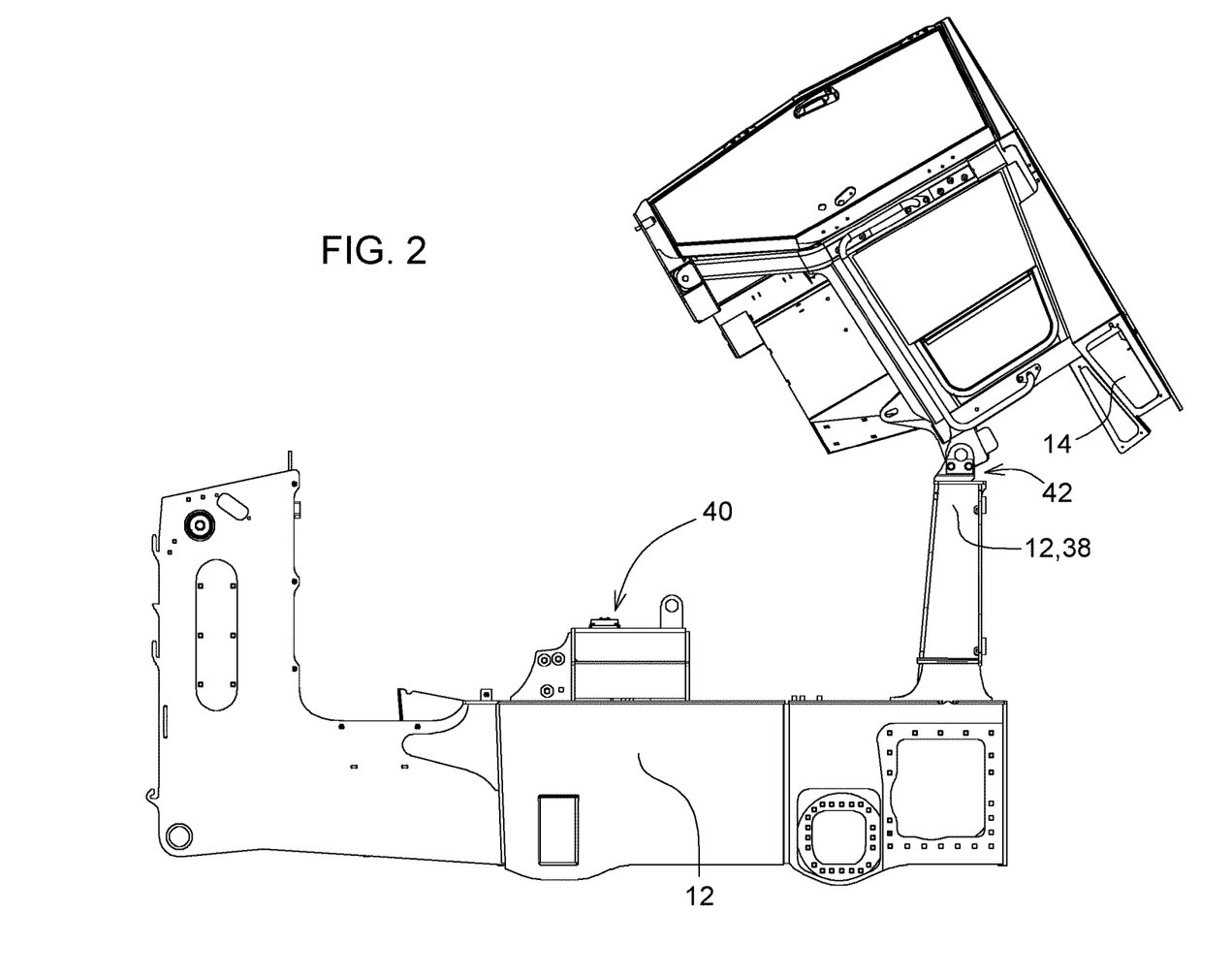
FIG. 2 is a side elevation view of the machine frame and cab of the dozer of FIG. 1, with the cab tilted up and rearward to a service position allowing access to machine components below the cab.

FIG. 2 shows the machine frame 12 and cab 14 of the work machine 10 with the other components removed for ease of illustration. The cab 14 is shown tilted upward and rearwardly to a service position which allows access to the components of the work machine 10 located below the cab 14.

When the cab 14 is in its lowered operating position of FIG. 1 the cab 14 may be attached to the machine frame with two releasable forward cab mounts 40 and two rear pivotal connections 42. Only the left hand side forward cab mount 40 and rear pivotal connection 42 are visible in FIG. 2. The machine frame 12 includes a rear pedestal portion 38. The rear pivotal connections 42 are mounted on top of the rear pedestal portion 38 of the machine frame 12. As further explained below the two rear pivotal connections 42 allow the cab 14 to be tilted relative to the machine frame 12 between the lowered operating position of FIG. 1 and the raised service position of FIG. 2.

Figure 3:
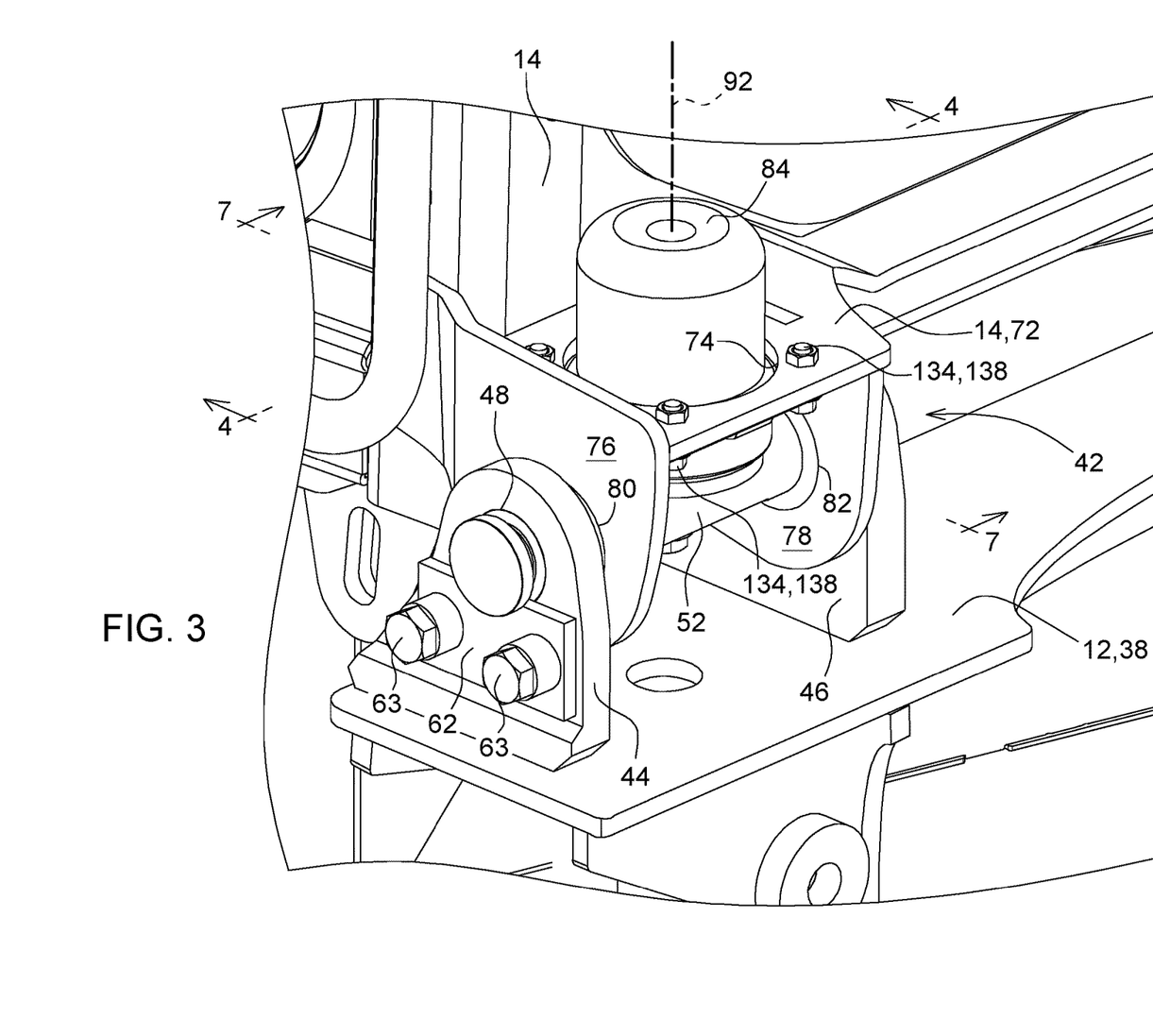
FIG. 3 is a perspective view of the left side pivotal connection of the cab to the machine frame of FIG. 2.

FIG. 3 is a perspective view of the left side rear pivotal connection 42. The pivotal connection 42 includes first and second clevises 44 and 46 fixed to the machine frame 12. The first and second clevises 44 and 46 may be made of steel plate welded to the top of the rear pedestal portion 38 of the machine frame 12. The first and second clevises 44 and 46 include first and second aligned pin openings 48 and 50, respectively. A pivot pin 52 is received through the pin openings 48, 50 so that the pivot pin 52 is pivotable relative to the machine frame 12. Optionally bushings 54 and 56 may be received in pin openings 48 and 50, respectively, to provide a bearing surface on which the pivot pin 52 pivots. Bushings 54 and 56 may be nylon bushings.

Pivot pin 52 has an annular groove 58 formed therein near the left end 60. When the pivot pin 52 is in its proper axial position within the pin openings 48 and 50 of clevises 44 and 46 the annular groove 58 is located immediately outside the clevis 44. A retainer plate 62 is loosely received in annular groove 58 and is held in place by bolts 63 attaching the retainer plate 62 to the clevis 44. Retainer plate 62 as received in annular groove 58 axially retains pivot pin 52 within the pin openings 48 and 50 while allowing the pivot pin 52 to pivot, i.e. rotate, about its pivot axis 64 relative to clevises 44 and 46 of machine frame 12. Alternatively instead of the retainer plate 62 received in the annular groove 58, one or more C-clips could be used to retain the pivot pin axially in place relative to the clevises 44 and 46. The retainer plate 64 or such C-clips may be generally referred to as retainers 62.

Pivot pin 52 further includes upper and lower flats 66 and 68 formed on a mid-portion of the pivot pin 52. The upper and lower flats 66 and 68 may be parallel to each other and formed on diametrically opposite sides of the pivot pin 52. A bolt hole 70 extends diametrically through pivot pin 52 between and perpendicular to the flats 66 and 68.

Figure 4:
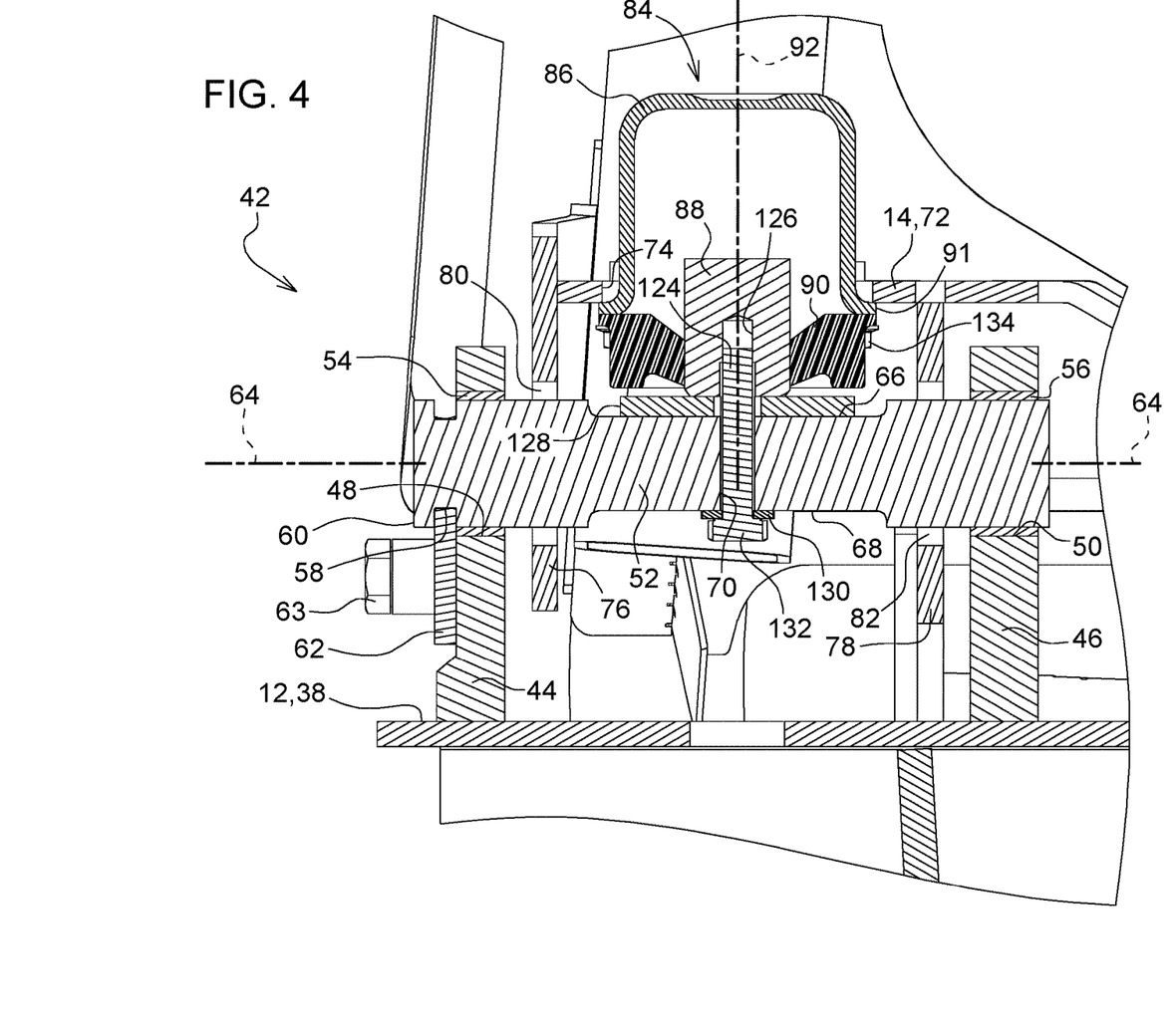
FIG. 4 is a rear elevation cross-section view of the pivotal connection of FIG. 3.

The cab 14 includes two rear mounting flanges 72. The left side rear mounting flange 72 is seen in FIGS. 3 and 4. A flange opening 74 is defined in mounting flange 72. First and second downward extending plates 76 and 78 have loop openings 80 and 82, respectively defined therein. The plates 76 and 78 with openings 80 and 82 may be referred to as retaining loops 76 and 78. The plates 76 and 78 may be welded to the rear mounting flange 72, all of which forms a rigid portion of the cab 14. As can be seen in FIGS. 3 and 4, the retaining loops 76 and 78 surround the pivot pin 52 and are spaced from the pivot pin 52 during normal operation of the work machine 10. But in the event of a rollover of the work machine 10 in which forces impacting the cab 14 may destroy the viscous mounts, the retaining loops 76 and 78 remain in place about the pivot pin 52 and prevent the cab 14 from being detached from the pivot pin 52.

The pivotal connection 42 further includes a viscous mount 84 which supports the cab 14 from the machine frame 12 while providing vibrational isolation and damping there between. Viscous mounts are also sometimes referred to as hydraulic mounts. These viscous mounts may be of any available design, including those described in Liu et al, "Elastomeric Components for Noise and Vibration Isolation and Control in the Automotive Industry", Encyclopedia of Automotive Engineering, Online, John Wiley & sons, Ltd. (2014) at section 4.2 "Hydraulic engine mounts", pages 5-7, which is incorporated herein by reference.

In FIG. 4 the viscous mount 84 is schematically shown in cross-section and can be described as including a housing portion or first portion 86, a plunger portion or second portion 88, and a flexible portion 90 connecting the plunger portion 88 to the housing portion 90. A mounting flange 91 of housing portion 86 is connected to the cab mounting flange 72 of cab 14. The plunger portion 88 is connected to the pivot pin 52 between the first and second clevises 44 and 46 as further described below. Thus when the cab 14 is tilted up from the position of FIG. 1 to the position of FIG. 2, or back down, the cab 14 and the viscous mount 84 pivot with the pivot pin 52 about pivot axis 64 relative to machine frame 12.

The flexible portion 90 of viscous mount 84 allows movement of the plunger portion 88 relative to the housing portion 86 along a longitudinal mount axis 92. These are vibrational movements of small amplitude. That vibrational movement is damped by the internal damping arrangements of each viscous mount. Longitudinal mount axis 92 preferably is perpendicular to pivot axis 64.

When the cab 14 is in the lowered operating position of FIG. 1 the longitudinal mount axis 92 is generally vertically oriented with the plunger portion 88 located below the housing portion 86. This orientation is inverted from the typical orientation in which viscous mounts are generally used. This inverted orientation allows the plunger portion 88 to be attached directly to the pivot pin 52 and thus minimizes the distance by which the viscous mount 84 projects away from the pivot axis 64. This shortens the moment arm from the pivot axis 64 to the connection of the housing portion 86 to the cab flange 72 of cab 14, which lessens deformation of the viscous mount 84 due to forces directed off of the longitudinal mount axis 92 during tilting of the cab 14 or when the machine 10 is shaking front to back and side to side during operation.

The inverted orientation of the viscous mount 84 also further isolates the cab 14 from rattling inherent in a pinned connection such as between pivot pin 52 and the clevises 44 and 46, because the viscous mount 84 is located between the cab 14 and the pivot pin 52.

Figure 5:
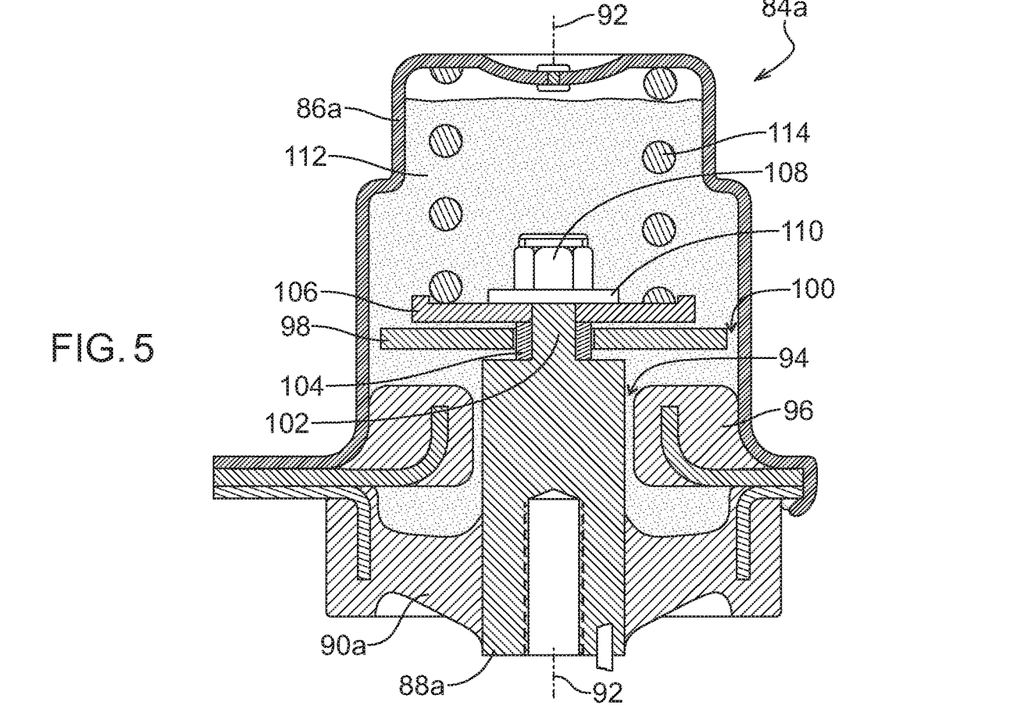
FIG. 5 is a schematic elevation cross-section view of one type of viscous mount that may be used with the pivotal connection of FIG. 3.

One suitable viscous mount 84 is shown in FIG. 5 and designated as 84a. Viscous mount 84a is of the type generally referred by Liu as a viscous damped mount. The viscous mount 84a is of a type manufactured by Fukoku Co., Ltd. of Japan, and its details are described in U.S. Pat. No. 7,604,223, which is incorporated herein by reference. The viscous mount 84a includes a housing portion 86a, a plunger portion 88a, and a flexible portion 90a connecting the housing portion 86a to the plunger portion 88a. The plunger portion 88a extends with clearance 94 through a damping body 96 which is fixed relative to the housing portion 86a. Additionally the plunger portion 88a carries a damping plate 98 which has an annular clearance 100 between the damping plate 98 and the housing portion 86a. The plunger portion 88a includes a threaded stud 102. A spacer 104 fits over stud 102. Damping plate 98 fits over spacer 104. A spring support plate 106 fits over stud 102 above spacer 104 and is held tightly against spacer 104 by nut 108 and washer 110. A spring 114 is compressed between the upper end of housing portion 86a and the spring support plate 106 to bias the plunger portion 88*a* away from the housing portion 86*a*. The housing portion 86*a* contains a viscous fluid 112 which damps vibrational motion of plunger portion 88*a* relative to housing portion 86*a* as the viscous fluid flows through clearances 94 and 100.

Figure 6:
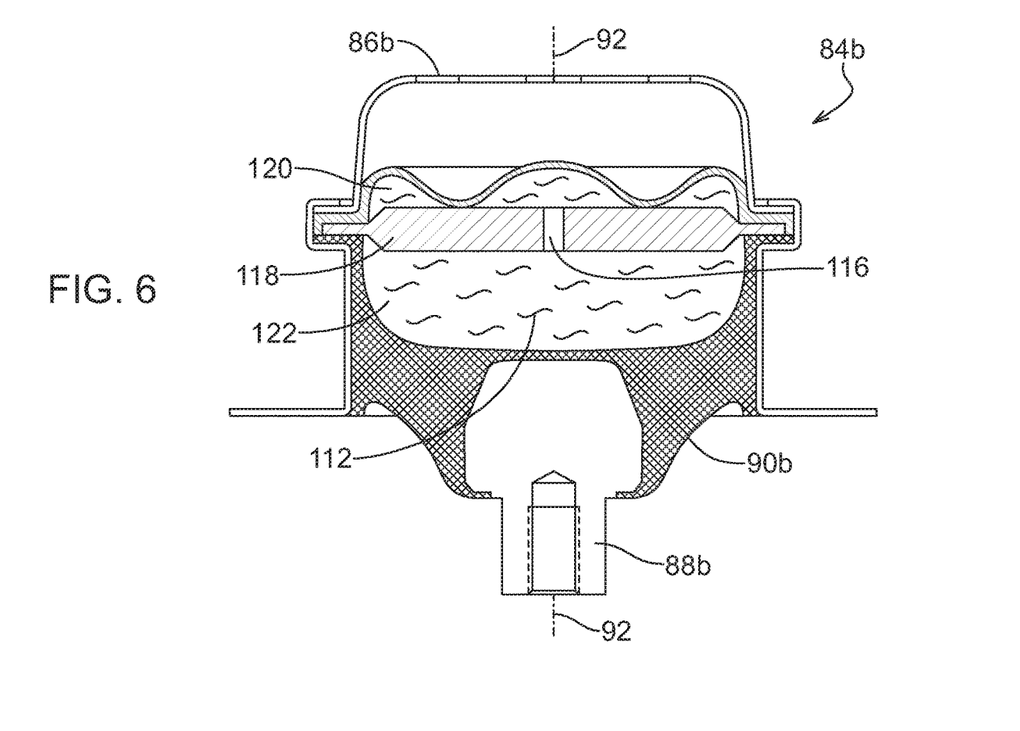
FIG. 6 is a schematic elevation cross-section view of a second type of viscous mount that may be used with the pivotal connection of FIG. 3.

Another suitable viscous mount 84*b* is shown in FIG. 6 and is of the type generally referred to by Liu as orifice damped. The viscous mount 84*b* is of a type manufactured by Lord Corporation of Cary, N.C., USA. The viscous mount 84*b* includes a housing portion 86*b*, a plunger portion 88*b*, and a flexible portion 90*b* connecting the housing portion 86*b* to the plunger portion 88*b*. Vibrational movement of the plunger portion 88*b* and flexible portion 90*b* relative to housing portion 86*b* pumps viscous fluid 112 between upper and lower fluid chambers 118 and 120 through an orifice 116 in an orifice plate 118 which is fixed relative to housing portion 86*b*.

As is schematically illustrated in FIG. 4 a threaded fastener 124, shown as a capscrew 124, extends through bolt hole 70 of pivot pin 52 and threadedly engages a threaded bore 126 of the plunger portion 88. The lower end of plunger portion 88 engages support plate 128 which engages upper flat 66 of pivot pin 52. A spring washer 130 may be placed between lower flat 68 and the head 132 of threaded fastener 124. When the threaded fastener 132 is tightened it pulls the plunger portion 88 tightly against the support plate 128 and the upper flat 66 of pivot pin 52.

Methods of Assembly:

To assemble the pivotal connections 42 between the cab 14 and the machine frame 12 the housing portion 86 of the viscous mount 84 of each pivotal connection 42 is loosely attached to the cab mounting flange 72 via a laterally adjustable connection 134 between the mounting flange 91 of housing portion 86 and the cab mounting flange 72 of cab 14. The housing portion 86 of the viscous mount 84 is loosely received through the flange opening 74 of cab mounting flange 72 so that lateral movement of housing portion 86 relative to cab mounting flange 72 is still possible. The cab 14 is then lowered onto the machine frame 12 until the openings in the safety loops 78 and 78 generally align with the openings 48 and 50 in the clevises 44 and 46. The pivot pin 52 may then be slid into place through the openings of the clevises 44 and 46 and the safety loops 76 and 78, and then fixed axially in place with the retainer 62. The threaded fastener 124 is then placed through the bolt hole 70 of pivot pin 52 and threaded into threaded bore 126 of plunger portion 88 and tightened to fix the plunger portion 88 to the pivot pin 52. Then the laterally adjustable connection 134 is tightened to fix the housing portion 86 to the cab mounting flange 72 of cab 14.

Figure 7:
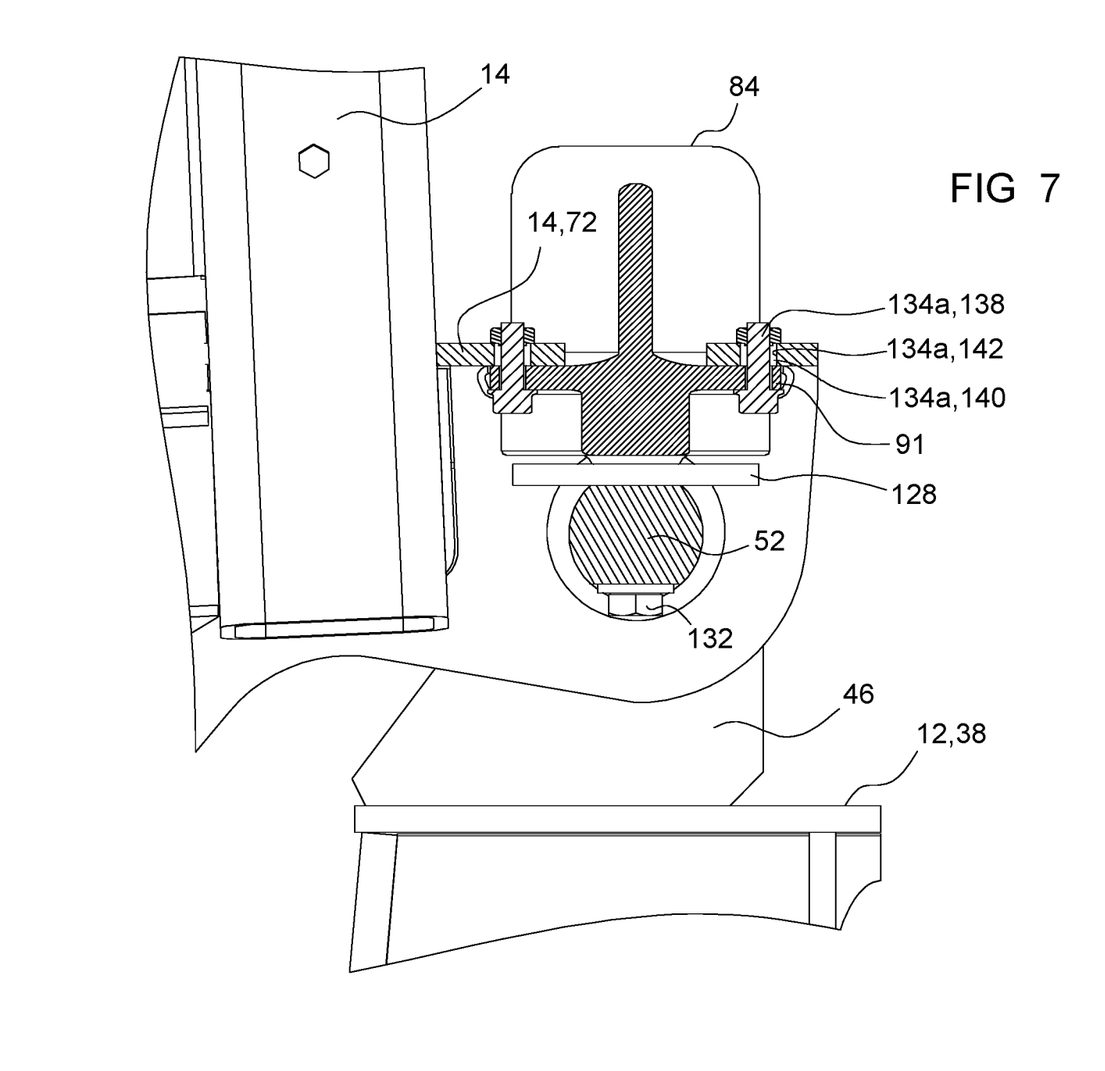
FIG. 7 is a side elevation cross-section view of the pivotal connection of FIG. 3 showing one embodiment of a laterally adjustable connection between the viscous mount and the cab.

One embodiment of the laterally adjustable connection 134 is shown in FIG. 7 and designated as 134*a*. The laterally adjustable connection 134*a* is provided by a clearance 140 between bolts 138 and bolt holes 142 formed in the cab mounting flange 72.

Figure 8:
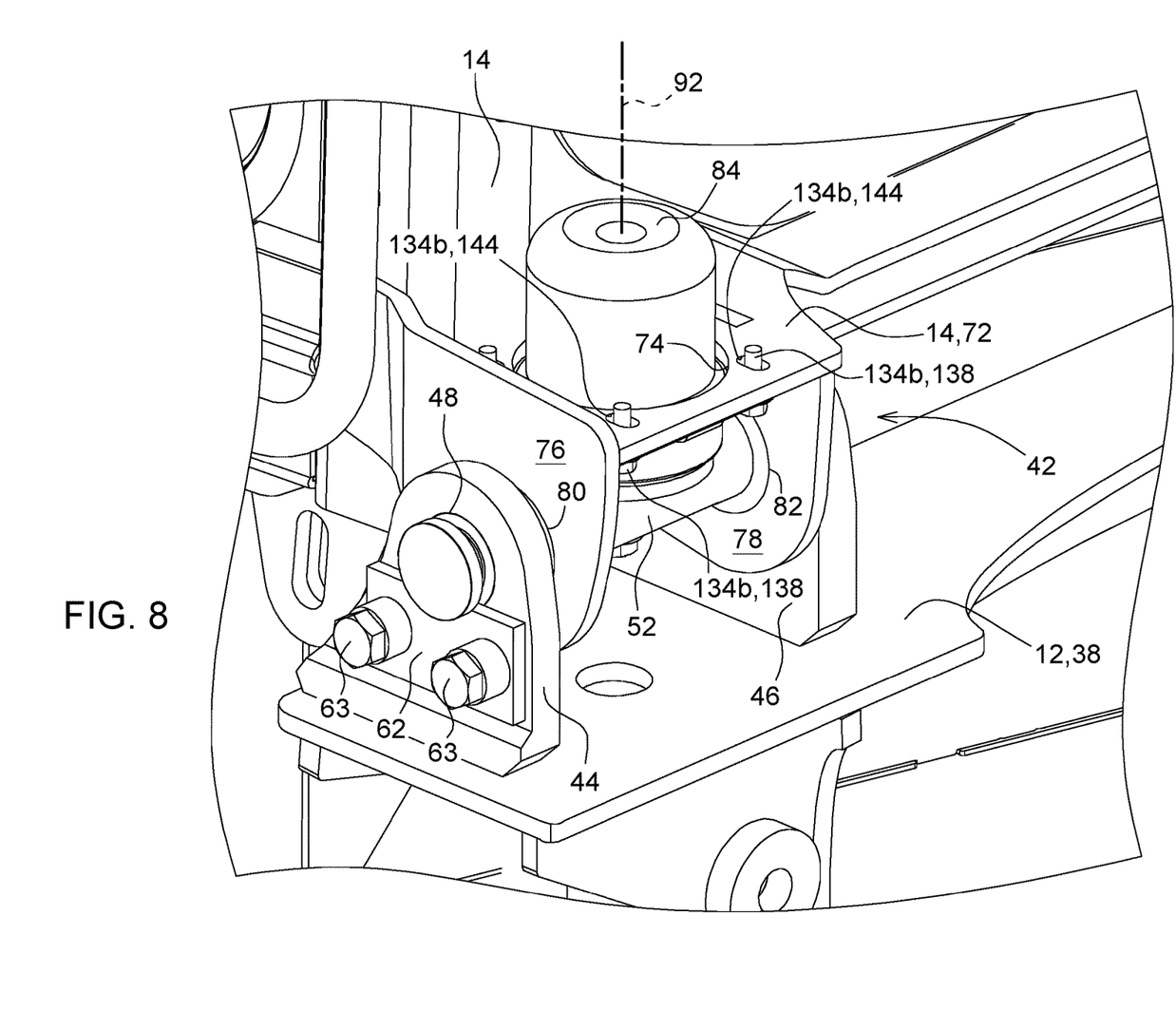
FIG. 8 is a perspective view similar to FIG. 3 showing a second embodiment of a laterally adjustable connection between the viscous mount and the cab.

Another embodiment of the laterally adjustable connection 134 is shown in FIG. 8 and designated as 134*b*. The laterally adjustable connection 134*b* provides slots 144 in which the bolts 138 are received. In FIG. 8 the slots 144 are aligned front to rear. Alternatively the slots 144 could be aligned left to right. In FIG. 8 the nuts have been left off of the top ends of the bolts 138 so that the slots 144 may be clearly seen.

Still another embodiment of the laterally adjustable connection 134 may for example be provided by clamps (not shown) attached to the underside of cab mounting flange 72 with bolts 138 to sandwich the mounting flange 91 of viscous mount 84 between the clamps +− and the cab mounting flange 72.

This may be further described as a method of assembling a pivotal connection 42 of a cab 14 and a machine frame 12 of a work machine 10 to allow the cab 14 to be tilted relative to the machine frame 12, the cab 14 including a mounting flange 72 having a flange opening 74 therein, the cab 14 further including at least one safety loop 76, 78 extending from the mounting flange 72, the method comprising:

(a) placing the first portion 86 of the viscous mount 84 through the flange opening 74 of mounting flange 72 of cab 14;

(b) attaching the viscous mount 84 to the mounting flange 72 of the cab 14 with the laterally adjustable connection 134;

(c) lowering the cab 14 and the viscous mount 84 toward the machine frame 12 until the at least one safety loop 76, 78 is aligned with pin openings 48, 50 of the first and second clevises 44, 46 attached to the machine frame 12;

(d) inserting the pivot pin 52 through the pin openings 48, 50 and the at least one safety loop 76, 78 so that the pivot pin 52 is pivotable relative to the machine frame 12;

attaching the second portion 88 of the viscous mount 84 to the pivot pin 52 between the first and second clevises 44, 46.

The method may further include the step of retaining the pivot pin 52 within the pin openings 48 and 50 of the first and second clevises 44 and 46 with at least one retainer 62 attached to at least one of the first and second clevises 44 and 46.

Step (e) may be further described as including extending the threaded fastener 124 through the pivot pin 52 and tightening the threaded fastener 124 to fix the second portion 88 of the viscous mount to the pivot pin 52.

The method may further be described as:

in step (a) the first portion 86 of the viscous mount 84 includes a laterally adjustable connection 134 to the mounting flange 72 of the cab;

wherein step (b)) includes loosely attaching the viscous mount 84 to the mounting flange 72 of the cab such that there is a clearance of the flange opening 74 around the first portion 86 of the viscous mount 84; and further comprising after step (e), fixing the position of the viscous mount 84 laterally relative to the cab flange 72.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims Each disclosed feature or embodiment may be combined with any of the other disclosed features or embodiments.

What is claimed is:

1. A work machine, comprising:
   a machine frame;
   a cab supported from the machine frame; and
   at least one pivotal connection between the cab and the machine frame for allowing the cab to be tilted relative to the machine frame, the pivotal connection including:

first and second clevises fixed to the machine frame, the first and second clevises including first and second aligned pin openings, respectively;

a pivot pin received through the pin openings so that the pivot pin is pivotable relative to the machine frame; and a viscous mount including a housing portion, a plunger portion, and a flexible element connecting the plunger portion to the housing portion, the housing portion being attached to the cab, and the plunger portion being attached to the pivot pin between the first and second clevises such that the cab and the viscous mount are pivotable with the pivot pin relative to the machine frame.

2. The work machine of claim 1, wherein:
the pivot pin includes a pivot axis about which the pivot pin pivots relative to the machine frame;
the viscous mount includes a longitudinal mount axis along which the plunger portion is movable relative to the housing portion; and
wherein the longitudinal mount axis is perpendicular to the pivot axis.

3. The work machine of claim 1, further comprising:
a threaded fastener extending through the pivot pin and engaging the plunger portion such that the threaded fastener fixes the plunger portion to the pivot pin.

4. The work machine of claim 3, wherein:
the pivot pin includes a pivot axis about which the pivot pin pivots relative to the machine frame;
the pivot pin includes a flat defined on an outer surface of the pivot pin, the flat extending parallel to the pivot axis;
the threaded fastener extends perpendicular to the flat and pulls the plunger portion toward the flat.

5. The work machine of claim 1, further comprising:
a support plate received between the plunger portion and the flat so that the plunger portion engages the support plate and the support plate engages the flat.

6. The work machine of claim 3, wherein:
the plunger portion includes a threaded bore facing away from the housing portion; ands
the threaded fastener is a cap screw threadedly engaging the threaded bore of the plunger portion.

7. The work machine of claim 1, further comprising:
at least one retainer attached to at least one of the first and second clevises and engaging the pivot pin to axially retain the pivot pin in place within the pin openings of the first and second clevises.

8. The work machine of claim 1, further comprising:
first and second bushings disposed between the pivot pin and the pin openings of the first and second clevises, respectively.

9. The work machine of claim 1, wherein:
the cab includes a mounting flange having a flange opening therein;
the housing portion of the viscous mount is received through the flange opening with clearance surrounding the housing portion;
the viscous mount includes a longitudinal mount axis along which the plunger portion is movable relative to the housing portion; and
the work machine further includes laterally adjustable connection between the housing portion of the viscous mount and the mounting flange of the cab such that the housing portion can be adjusted in position relative to the mounting flange laterally relative to the longitudinal mount axis.

10. The work machine of claim 1, wherein:
the cab is tiltable between a lowered operating position and a raised service position;
the viscous mount includes a longitudinal mount axis along which the plunger portion is movable relative to the housing portion; and
when the cab is in the lowered operating position the longitudinal mount axis of the viscous mount is generally vertically oriented with the plunger portion located below the housing portion.

11. The work machine of claim 1, further comprising:
at least one retaining loop attached to the cab, the retaining loop surrounding the pivot pin but spaced from the pivot pin during normal operation of the work machine, so that in the event of rollover of the work machine the at least one retaining loop prevents the cab from being detached from the pivot pin.

12. A method of assembling a pivotal connection of a cab and a machine frame of a work machine to allow the cab to be tilted relative to the machine frame, the cab including a mounting flange having a flange opening therein, the cab further including at least one safety loop extending from the mounting flange, the method comprising:

(a) placing a first portion of a viscous mount through the flange opening;

(b) attaching the viscous mount to the mounting flange of the cab;

(c) lowering the cab and the viscous mount toward the machine frame until the at least one safety loop is aligned with pin openings of first and second clevises attached to the machine frame;

(d) inserting a pivot pin through the pin openings and the at least one safety loop so that the pivot pin is pivotable relative to the machine frame;

(e) attaching a second portion of the viscous mount to the pivot pin between the first and second clevises.

13. The method of claim 12, further comprising:
retaining the pivot pin in place within the pin openings of the first and second clevises with at least one retainer attached to at least one of the first and second clevises.

14. The method of claim 12, wherein step (e) further comprises:
extending a threaded fastener through the pivot pin, the threaded fastener being also engaged with the second portion of the viscous mount; and
tightening the threaded fastener to fix the second portion of the viscous mount to the pivot pin.

15. The method of claim 12, wherein:
in step (a) the first portion of the viscous mount includes a laterally adjustable connection to the mounting flange of the cab;
step (b) includes loosely attaching the viscous mount to the mounting flange of the cab such that there is a clearance of the flange opening around the first portion of the viscous mount; and
further comprising after step (e), fixing the position of the viscous mount laterally relative to the cab flange.

* * * * *